Jan. 28, 1958 R. B. HUSSEY 2,821,678
REGULATOR FOR THREE PHASE ALTERNATOR
Filed Dec. 4, 1956 2 Sheets-Sheet 1

INVENTOR.
RUSSELL B. HUSSEY
BY
ATTORNEY.

INVENTOR.
RUSSELL B. HUSSEY
BY
ATTORNEY.

United States Patent Office 2,821,678
Patented Jan. 28, 1958

2,821,678

REGULATOR FOR THREE PHASE ALTERNATOR

Russell B. Hussey, East Longmeadow, Mass., assignor to American Bosch Arma Corporation, a corporation of New York Application December 4, 1956, Serial No. 626,262

14 Claims. (Cl. 322—25)

This invention relates to a voltage regulator for accurately controlling either a single or poly-phase alternator over its entire speed and load range and has particular reference to such a device which is not appreciably sensitive to alternator speed or frequency.

This application is a continuation in part of my application, Serial No. 526,516, filed August 4, 1955.

Another object of the invention is to provide a device of the type set forth which employs non-linear resistors in which the current varies non-linearly with applied voltage.

Another object is to provide a new and improved device of the type set forth which is relatively simple in design and circuitry.

Other objects and advantages of the invention will be apparent from the following description taken in connection with the accompanying drawing. It will be understood that changes may be made in the details of construction and arrangement of parts without departing from the scope of the invention as set forth in the accompanying claims, as the preferred form has been given by way of illustration only.

Referring to the drawing.

Figure 1:
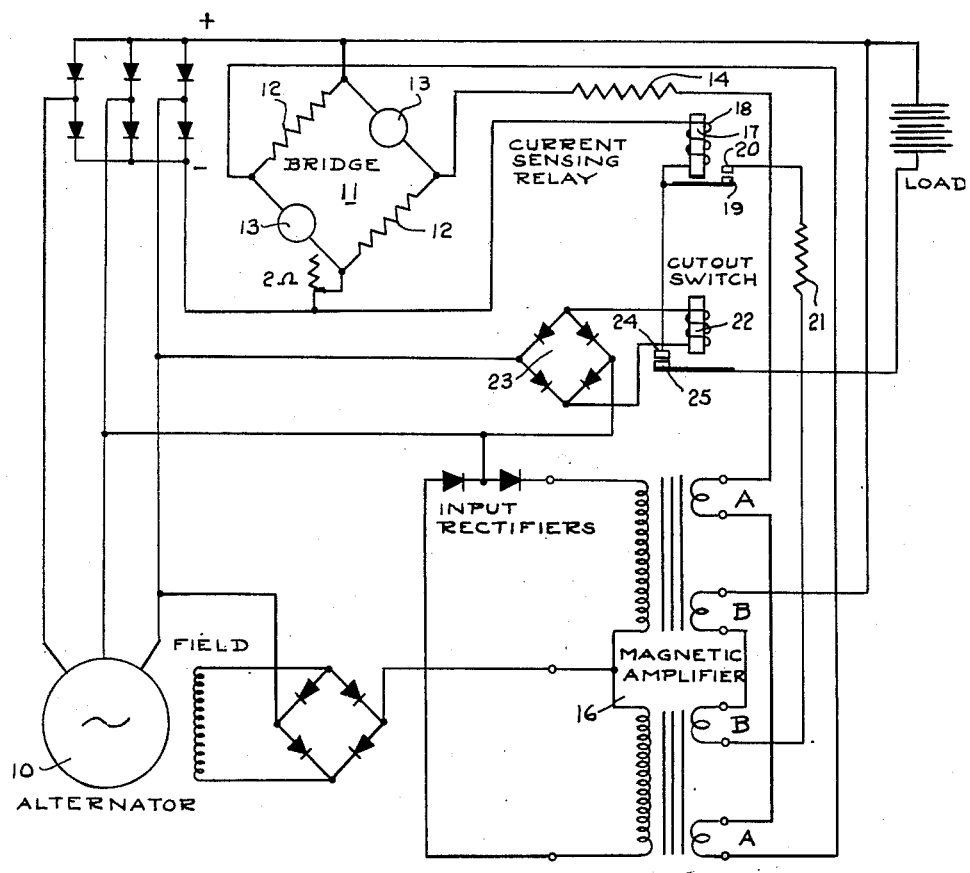
Fig. 1 is a wiring diagram of a preferred form of the invention.

In Fig. 1, 10 is the alternator, the output of which is to be controlled, 11 is a bridge circuit electrically connected to alternator 10 and bridge 11 embodies a pair of fixed resistors 12 and a pair of non-linear resistors 13 connected in series with a variable resistor, for voltage adjustment, across the rectified output of the alternator 10, the output of which is rectified by the output rectifiers. The other two legs of the bridge 11 are connected to the control winding or windings A in the magnetic amplifier 16. To increase the response of action, it may be desirable to insert some additional resistance 14 in this control circuit and a choke can be used for this purpose. The foregoing describes the voltage sensing network.

The current sensing network comprises a relay 17 having a current winding 18 and equipped with normally opened contacts 19 and 20. The contacts 19 and 20 are series connected with a resistor or choke 21 and a control winding or windings B in the magnetic amplifier 16 and connected across the rectified output of the alternator 10.

A cutout switch is provided which consists of a relay 22 having a voltage winding supplied through rectifiers 23 from the A. C. alternator output.

The cutout switch is provided with the contacts 24 and 25.

The operation of the device is as follows:

The magnetic amplifier 16, which preferably, as shown, includes a pair of saturable reactors, which when not saturated, absorbs the applied voltage and, therefore, there is no current output. When saturated, it absorbs very little of the applied voltage and will then deliver output current. The control required to change the amplifier from full cut-off to full conduction is provided by the control windings in the amplifier and the amplifier output is applied to the alternator field.

The voltage sensing bridge 11 produces an output voltage signal which increases at about ⅙ the rate of the line, and gradually tapers to a maximum value and then decreases at about ⅒ the rate of increase in line voltage. This signal voltage, therefore, decreases to zero at a line voltage determined by the values of resistances in the bridge circuit. Any further increase in line voltage causes the signal voltage to reverse and increase with the opposite polarity at a known rate, as will be seen from Fig. 3.

This signal voltage is applied directly to control the magnetic amplifier. The system is self energizing since the alternator residual is sufficient to produce a bridge voltage signal that will saturate the amplifier and give field excitation. When the system voltage increases to the controlled value, the signal voltage causes amplifier cut-off, reduction in field excitation and output voltage. Reduction in output voltage causes the signal to re-establish amplifier output and this cycle is thus repeated at a frequency dependent on alternator speed and load.

There are, of course, no mechanically moving parts during voltage regulation.

During current limit the amplifier current control windings are energized by means of the current relay contacts and this control energy causes amplifier cut-off and is applied in pulses at a frequency determined by the response of the system. Since this control current is milliamperes, there is practically no contact wear.

The cutout switch is only for the purpose of preventing battery drain due to the small current draw of the bridge circuit and leakage of the rectifiers. There being no appreciable reverse current, the relay is equipped with a voltage coil only and is energized from the A. C. output of the alternator. It is adjusted to close and open at a value below battery voltage.

Temperature compensation is accomplished by the proper selection of the two fixed resistors in the voltage sensing bridge. An increase in the ohmic value of these resistors lowers the regulated voltage, and a decrease in value raises the regulated voltage, therefore, temperature compensation is a function of these resistor values versus ambient temperature.

Although this regulator is simple in design and circuitry, it is not responsive to frequency and will, therefore, accurately control both voltage and current over the entire speed and load range of the alternator.

Figure 2:
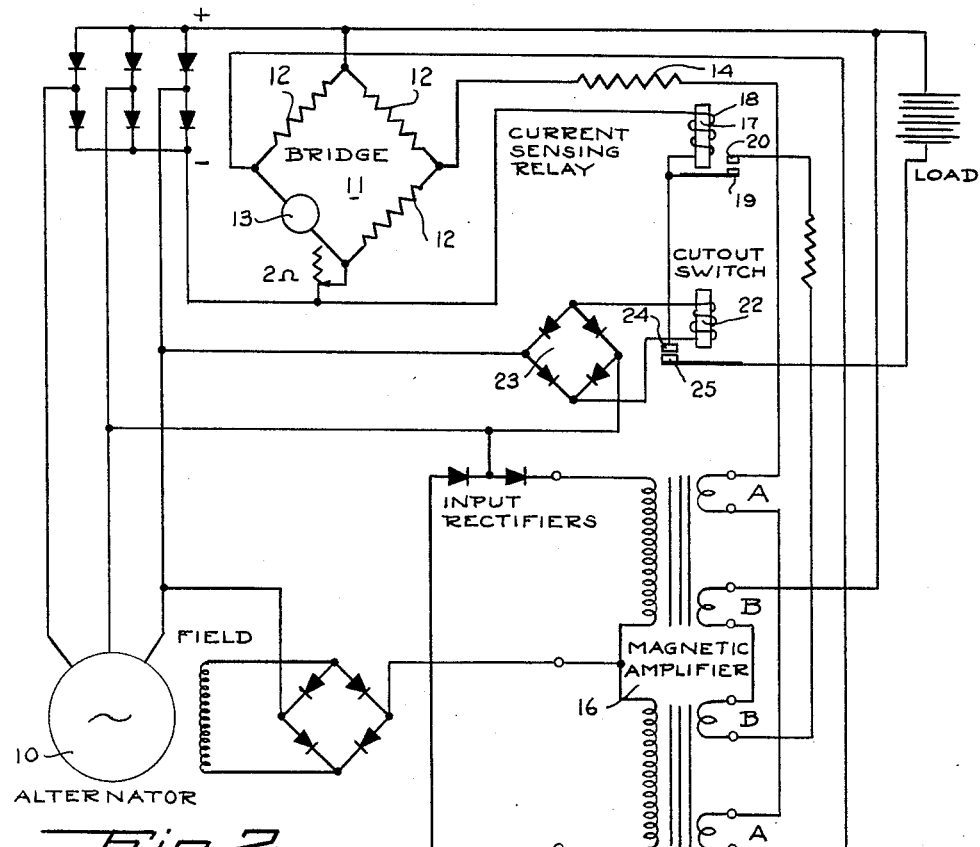
Fig. 2 is a wiring diagram of a modified form of the invention.

In the form of the invention shown in Fig. 2, only one non-linear resistor 13 is employed in the bridge circuit 11 with three linear resistors 12, and only one half of the signal voltage is obtained as compared with the form of the invention of Fig. 1.

Figure 3:
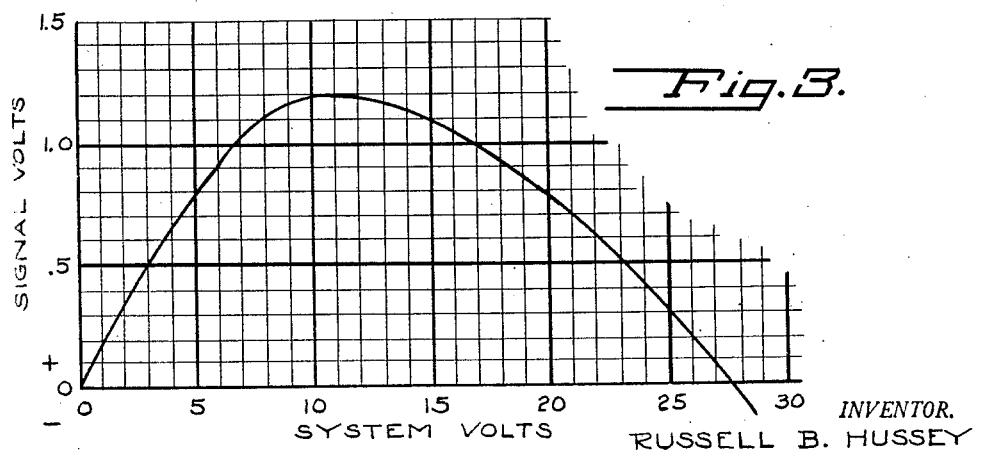
Fig. 3 is a chart illustrating the control obtained by a regulator embodying the present invention.

In Fig. 3 is shown a graph showing the voltage characteristics of the bridge of the form of Fig. 1 and which functions as a measuring device, producing a signal voltage of changing polarity and magnitude within a predetermined range of system voltage. This signal voltage is applied to the magnetic amplifier which in turn controls the excitation of the alternator field.

In connection with the form of Fig. 2, the signal voltages would be one half that shown in Fig. 3, because only one non-linear resistor 13 is employed in the bridge circuit 11.

From the foregoing, it will be seen that I have pro-

I claim:

1. In a device of the character described, comprising an alternator having a field winding and output conductors, a voltage sensing network comprising, a bridge circuit including a pair of fixed resistors and a pair of nonlinear resistors, a rectifier connected across said output conductors, means for connecting the output of said rectifier to said voltage sensing network, means responsive to the current output of said alternator comprising, a current sensing network, a self saturating reactor means having control windings and output windings, means for connecting said voltage sensing means and said current sensing means respectively to said control windings and for connecting said output windings to said alternator field winding.

2. In a device of the character described, comprising an alternator having a field winding and output conductors, a voltage sensing network comprising, a bridge circuit including a pair of fixed resistors and a pair of nonlinear resistors, a rectifier connected across said output conductors, means for connecting the output of said rectifier to said voltage sensing network, means responsive to the current output of said alternator comprising, a current sensing network, a self saturating reactor means having control windings and output windings, means for connecting said voltage sensing means and said current sensing means respectively to said control windings, and for connecting said output windings to said alternator field winding, and a cutout switch interposed between the alternator output and load for disconnecting the load from the alternator at predetermined voltage, said cutout switch comprising a relay having a voltage winding supplied from the A. C. alternator output.

3. In a device of the character described, comprising an alternator having a field winding and output conductors, a voltage sensing network comprising, a bridge circuit including a pair of fixed resistors and a pair of nonlinear resistors, a rectifier connected in series with a variable resistor across said output conductors, means for connecting the output of said rectifier to said voltage sensing network, means responsive to the current output of said alternator comprising, a current sensing network, a self saturating reactor means having control windings and output windings, means for connecting said voltage sensing means and current sensing means respectively to said control windings, and for connecting said output windings to said alternator field winding.

4. In a device of the character described, comprising an alternator having a field winding and output conductors, a voltage sensing network comprising, a bridge circuit including a pair of fixed resistors and a pair of nonlinear resistors, a rectifier connected in series with a variable resistor across said output conductors, means for connecting the output of said rectifier to said voltage sensing network, means responsive to the current output of said alternator comprising, a current sensing network, a self saturating reactor means having control windings and output windings, means for connecting said voltage sensing means and current sensing means respectively to said control windings and for connecting said output windings to said alternator field winding, and a cutout switch interposed between the alternator output and load for disconnecting the load from the alternator at predetermined voltage, said cutout switch comprising a relay having a voltage winding supplied from the A. C. alternator output.

5. In a device of the character described, comprising an alternator having a field winding and output conductors, a voltage sensing network comprising, a bridge circuit including a pair of fixed resistors and a pair of nonlinear resistors, a rectifier connected in series with a variable resistor across said output conductors, means for connecting the output of said rectifier to said voltage sensing network, means responsive to the current output of said alternator comprising, a current sensing network comprising a relay having a current winding and contacts, a self saturating reactor means having control windings and output windings, means for connecting said voltage and current sensing means respectively to said control windings and for connecting said output windings to said alternator field winding.

6. In a device of the character described, comprising an alternator having a field winding and output conductors, a voltage sensing network comprising, a bridge circuit including a pair of fixed resistors and a pair of nonlinear resistors, a rectifier connected in series with a variable resistor across said output conductors, means for connecting the output of said rectifier to said voltage sensing network, means responsive to the current output of said alternator comprising, a current sensing network comprising a relay having a current winding and contacts, a self saturating reactor means having control windings and output windings, means for connecting said voltage and current sensing means respectively to said control windings and for connecting said output windings to said alternator field winding, and a cutout switch interposed between the alternator output and load for disconnecting the load from the alternator at predetermined voltage, said cutout switch comprising a relay having a voltage winding supplied from the A. C. alternator output.

7. In a device of the character described, comprising an alternator having a field winding and output conductors, a voltage sensing network comprising, a bridge circuit including a pair of fixed resistors and a pair of nonlinear resistors, a rectifier connected across said output conductors, means for connecting the output of said rectifier to said voltage sensing network, means responsive to the current output of said alternator comprising, a current sensing network, a pair of self saturating reactor means having control windings and output windings, means for connecting said voltage and current sensing means respectively to said control windings and for connecting said output windings to said alternator field winding.

8. In a device of the character described, comprising an alternator having a field winding and output conductors, a voltage sensing network comprising, a bridge circuit including a pair of fixed resistors and a pair of nonlinear resistors, a rectifier connected across said output conductors, means for connecting the output of said rectifier to said voltage sensing network, means responsive to the current output of said alternator comprising, a current sensing network, a pair of self saturating reactor means having control windings and output windings, means for connecting said voltage and said current sensing means respectively to said control windings and for connecting said output windings to said alternator field winding, and a cutout switch interposed between the alternator output and load for disconnecting the load from the alternator at predetermined voltage, said cutout switch comprising a relay having a voltage winding supplied from the A. C. alternator output.

9. In a device of the character described, comprising an alternator having a field winding and output conductors, a voltage sensing network comprising, a bridge circuit including a pair of fixed resistors and a pair of nonlinear resistors, a rectifier connected across said output conductors, means for connecting the output of said rectifier to said voltage sensing network, means responsive to the current output of said alternator comprising, a current sensing network comprising a relay having a current winding and normally opened contacts, a self saturating reactor means having control windings and output windings, means for connecting said voltage and said current sensing means respectively to said control windings and for connecting said output windings to said alternator field winding.

10. In a device of the character described, comprising an alternator having a field winding and output conductors, a voltage sensing network comprising, a bridge circuit including fixed and non-linear resistors, a rectifier connected across said output conductors, means for connecting the output of said rectifier to said voltage sensing network, means responsive to the current output of said alternator comprising, a current sensing network, a self saturating reactor means having control windings and output windings, means for connecting said voltage sensing means and said current sensing means respectively to said control windings and for connecting said output windings to said alternator field winding.

11. In a device of the character described, comprising an alternator having a field winding and output conductors, a voltage sensing network comprising, a bridge circuit including fixed and non-linear resistors, a rectifier connected across said output conductors, means for connecting the output of said rectifier to said voltage sensing network, means responsive to the current output of said alternator comprising, a current sensing network, a self saturating reactor means having control windings and output windings, means for connecting said voltage sensing means and said current sensing means respectively to said control windings and for connecting said output windings to said alternator field winding, and a cutout switch interposed between the alternator output and load for disconnecting the load from the alternator at predetermined voltage, said cutout switch comprising a relay having a voltage winding supplied from the A. C. alternator output.

12. In a device of the character described, comprising an alternator having a field winding and output conductors, a voltage sensing network comprising, a bridge circuit including three fixed and one non-linear resistors, a rectifier connected across said output conductors, means for connecting the output of said rectifier to said voltage sensing network, means responsive to the current output of said alternator comprising, a current sensing network, a self saturating reactor means having control windings and output windings, means for connecting said voltage sensing means and said current sensing means respectively to said control windings and for connecting said output windings to said alternator field winding.

13. In a device of the character described, comprising an alternator having a field winding and output conductors, a voltage sensing network comprising, a bridge circuit including three fixed and one non-linear resistors, a rectifier connected across said output conductors, means for connecting the output of said rectifier to said voltage sensing network, means responsive to the current output of said alternator comprising, a current sensing network, a self saturating reactor means having control windings and output windings, means for connecting said voltage sensing means and said current sensing means respectively to said control windings and for connecting said output windings to said alternator field winding, and a cutout switch interposed between the alternator output and load for disconnecting the load from the alternator at predetermined voltage, said cutout switch comprising a relay having a voltage winding supplied from the A. C. alternator output.

14. In a device of the character described, comprising an alternator having a field winding and output conductors, a voltage sensing network comprising, a bridge circuit including fixed and non-linear resistors, a rectifier connected across said output conductors, means for connecting the output of said rectifier to said voltage sensing network, a self saturating reactor means having control windings and output windings, means for connecting said voltage sensing means to said control windings and for connecting said output windings to said alternator field winding.

References Cited in the file of this patent

UNITED STATES PATENTS

| 2,456,938 | Harder | Dec. 21, 1948 |

FOREIGN PATENTS

| 400,974 | Germany | Aug. 23, 1924 |
| 142,494 | Austria | July 25, 1935 |
| 495,972 | Canada | Sept. 8, 1953 |